United States Patent
Simmen

(10) Patent No.: US 7,890,491 B1
(45) Date of Patent: *Feb. 15, 2011

(54) QUERY OPTIMIZATION TECHNIQUE FOR OBTAINING IMPROVED CARDINALITY ESTIMATES USING STATISTICS ON AUTOMATIC SUMMARY TABLES

(75) Inventor: David E. Simmen, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 2863 days.

This patent is subject to a terminal disclaimer.

(21) Appl. No.: 09/669,556

(22) Filed: Sep. 26, 2000

Related U.S. Application Data

(60) Provisional application No. 60/171,797, filed on Dec. 22, 1999.

(51) Int. Cl.
*G06F 7/00* (2006.01)
(52) U.S. Cl. .............. 707/713; 707/717; 707/718; 707/719
(58) Field of Classification Search ............ 707/2, 707/3, 713, 717–719
See application file for complete search history.

(56) References Cited

U.S. PATENT DOCUMENTS

| | | | |
|---|---|---|---|
| 5,542,073 A | | 7/1996 | Schiefer et al. |
| 5,761,653 A * | | 6/1998 | Schiefer et al. ............ 707/2 |
| 5,864,840 A * | | 1/1999 | Leung et al. ............... 707/2 |
| 5,864,841 A | | 1/1999 | Agrawal et al. |
| 5,897,632 A * | | 4/1999 | Dar et al. .................. 707/3 |
| 5,899,986 A | | 5/1999 | Ziauddin |
| 5,956,706 A | | 9/1999 | Carey et al. |
| 5,960,428 A | | 9/1999 | Lindsay et al. |
| 5,991,754 A * | | 11/1999 | Raitto et al. ............... 707/2 |
| 5,995,957 A * | | 11/1999 | Beavin et al. .............. 707/2 |
| 6,023,695 A * | | 2/2000 | Osborn et al. ............. 707/3 |
| 6,026,391 A * | | 2/2000 | Osborn et al. ............. 707/2 |
| 6,223,171 B1 * | | 4/2001 | Chaudhuri et al. ......... 707/2 |
| 6,275,818 B1 * | | 8/2001 | Subramanian et al. ...... 707/2 |
| 6,339,769 B1 * | | 1/2002 | Cochrane et al. .......... 707/4 |
| 6,345,272 B1 * | | 2/2002 | Witkowski et al. ......... 707/4 |

(Continued)

FOREIGN PATENT DOCUMENTS

EP 0875 838 A2 4/1998

OTHER PUBLICATIONS

"Filter Factor Estimation for Non-numeric Datatypes", IBM Technical Disclosure Bulletin; Article 41575, Nov. 1998, pp. 1505-1507.

(Continued)

*Primary Examiner*—Apu M Mofiz
*Assistant Examiner*—Cindy Nguyen
(74) *Attorney, Agent, or Firm*—Gates & Cooper LLP

(57) ABSTRACT

A technique for optimizing execution of a query that accesses data stored on a data store connected to a computer. Statistics on one or more automatic summary tables are used to determine an optimal query execution plan for the query. In particular, improved cardinality estimates are generated for one or more query execution plans for the query using statistics of one or more automatic summary tables that vertically overlap the query. These cardinality estimates are used to make more accurate cost estimates, thus improving the likelihood of determining the optimal query execution plan.

18 Claims, 5 Drawing Sheets

U.S. PATENT DOCUMENTS

| | | | |
|---|---|---|---|
| 6,363,371 | B1* | 3/2002 | Chaudhuri et al. ............. 707/2 |
| 6,434,545 | B1* | 8/2002 | MacLeod et al. ............... 707/3 |
| 6,460,027 | B1* | 10/2002 | Cochrane et al. ............... 707/2 |
| 6,477,523 | B1* | 11/2002 | Chiang ........................... 707/2 |
| 6,477,525 | B1* | 11/2002 | Bello et al. .................... 707/3 |
| 6,496,819 | B1* | 12/2002 | Bello et al. .................... 707/3 |
| 6,704,724 | B1* | 3/2004 | Ellmann et al. ................ 707/4 |
| 7,080,062 | B1* | 7/2006 | Leung et al. ................... 707/2 |
| 2002/0138460 | A1* | 9/2002 | Cochrane et al. ............... 707/1 |
| 2003/0088558 | A1* | 5/2003 | Zaharioudakis et al. ........ 707/3 |

OTHER PUBLICATIONS

"Integrated Buffer Management and Query Optimization Strategy for Relational Databases", IBM Technical Disclosure Bulletin; vol. 32, No. 12, May 1990 pp. 253-257.

"Adaptive Path Selection for Query with Input Variables", IBM Technical Disclosure Bulletin; vol. 32, No. 4A, Sep. 1989, pp. 265-267.

"Optimal Processor Allocation for Pipelined Hash Joins", IBM Technical Disclosure Bulletin; vol. 37, No. 02A, Feb. 1994, pp. 455-457.

Najjar, F. et al., "Cardinality estimation of distributed join queries", Proceedings. Tenth International Workshop on Database and Expert Systems Applications. DEXA 99, pp. 66-70, Published: Los Alamitos, CA, USA, 1999, xxii+937 pp. Abstract.

Oommen, B.J. et al., "Query result size estimation using a novel histogram-like technique: the rectangular attribute cardinality map", Proceedings. IDEAS' 99. International Database Engineering and Applications Symposium (Cat. No. PR00265), pp. 3-15, Published: Los Alamitos, CA, USA, 1999, xiii+467 pp. Abstract.

Zhong, Wu et al., "An algorithm for optimization of distributed queries", Chinese Journal of Computers, vol. 20, No. 11, pp. 1024-1033, Nov. 1997. Abstract.

Wan Sup Cho et al. "A new method for estimating the Number of objects satisfying an object-oriented query involving partial participation of classes", Information Systems, vol. 21, No. 3, pp. 253-267, May 1996. Abstract.

Ciaccia, P. et al., "Domains and active domains: what this distinction implies for the estimation of projection sizes in relational databases", IEEE Transactions on Knowledge and Data Engineering, vol. 7, No. 4, pp. 641-655, Aug. 1995. Abstract.

Swami, A. et al., "On the estimation of join result sizes", Advances in Database Technology—EDBT '94. $4^{th}$ International Conference on Extending Database Technology. Proceedings, pp. 287-300, Published: Berlin, Germany, 1994, xi+406 pp. Abstract.

Segev, A. et al., "Selectivity estimation of temporal data manipulations", Information Sciences, vol. 74, No. 1-2, pp. 111-149, Oct. 15, 1993. Abstract.

Meng Chang Chen et al., "Summary data estimation using decision trees", Knowledge discovery in databases, pp. 309-323, Published: Cambridge, MA, USA, 1991, xii+525 pp. Abstract.

* cited by examiner

QUERY OPTIMIZATION TECHNIQUE FOR OBTAINING IMPROVED CARDINALITY ESTIMATES USING STATISTICS ON AUTOMATIC SUMMARY TABLES

This application claims the benefit of U.S. Provisional Application No. 60/171,797, entitled, "A QUERY OPTIMIZATION TECHNIQUE FOR OBTAINING IMPROVED CARDINALITY ESTIMATES USING STATISTICS ON AUTOMATIC SUMMARY TABLES," filed Dec. 22, 1999, by David E. Simmen, which is incorporated by reference herein.

CROSS-REFERENCE TO RELATED APPLICATIONS

This application is related to the following co-pending and commonly-assigned patent applications:

Application No. 60/135,133, entitled "OPTIMIZING QUERIES USING AUTOMATIC SUMMARY TABLES," filed on May 20, 1999, by Roberta Jo Cochrane et al.;

Application No. 60/134,789, entitled "QUERY OPTIMIZATION METHOD FOR INCREMENTALLY ESTIMATING THE CARDINALITY OF A DERIVED RELATION WHEN STATISTICALLY CORRELATED PREDICATES ARE APPLIED," filed on May 19, 1999, by Johann Christoph Freytag et al.; and Application No. 60/134,745, entitled "COST-BASED ROUTING OF AUTOMATIC SUMMARY TABLES", filed on May 18, 1999, by Ting Yu Leung et al.; each of which is incorporated by reference herein.

FIELD OF THE INVENTION

This invention relates in general to database management systems performed by computers, and in particular, to a query optimization technique for obtaining improved cardinality estimates using statistics on automatic summary tables.

BACKGROUND OF THE INVENTION

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computing time or resources used and, therefore, the cost of doing the query. Each of these methods is a query execution plan (QEP).

The RDBMS software uses various data, including statistics in a RDBMS catalog, during bind time to determine the QEPs of SQL statements. A utility, called RUNSTATS, updates the RDBMS catalog with statistics on table spaces, indexes, tables, and columns. Additionally, when an SQL statement is processed during a bind phase, a QEP is determined for the statement. The QEP is a compiled run-time structure used for executing the SQL statement. The QEP is the path the RDBMS uses to get to the data that SQL statements request. For example, an SQL statement might search an entire table space, or it might use an index. The QEP is the key to determining how well an SQL statement performs. The data associated with the QEP is stored in the catalog, or optionally in a plan table.

Typically, when there are multiple QEPs to choose from, one is selected based on a detailed analysis of the execution costs of each alternative. Certain QEP operations reduce the number of records seen by subsequent operations by applying predicates, and one of the most important tasks of a cost-based optimizer is the estimation of the number of rows, or cardinality, of intermediate results after predicates are applied. Each conjunct, or predicate, of a search condition (e.g., a WHERE or HAVING clause) is assigned a so-called selectivity, which effectively represents the probability that the predicate is true for a given row. A given selectivity estimate is typically derived from statistics about the database, such as the number of distinct values of a referenced column. One of the drawbacks of traditional cardinality estimates is that they are based on an assumption that predicates are independent, when, typically, they are dependent. Additionally, traditional systems are unable to generate accurate cardinality estimates for complex predicates.

Thus, there is a need in the art for improved query optimization that is able to generated improved cardinality estimates.

SUMMARY OF THE INVENTION

To overcome the limitations in the prior art described above, and to overcome other limitations that will become apparent upon reading and understanding the present specification, the present invention discloses a method, apparatus, and article of manufacture for a query optimization technique for obtaining improved cardinality estimates using statistics on automatic summary tables.

According to an embodiment of the invention, a technique is provided for optimizing execution of a query that accesses data stored on a data store connected to a computer. Statistics on one or more automatic summary tables are used to determine an optimal query execution plan for the query. In particular, improved cardinality estimates are generated for one or more query execution plans for the query using statistics of one or more automatic summary tables that vertically overlap the query. These cardinality estimates are used to make more accurate cost estimates, thus improving the likelihood of determining the optimal query execution plan.

BRIEF DESCRIPTION OF THE DRAWINGS

Referring now to the drawings in which like reference numbers represent corresponding parts throughout.

DETAILED DESCRIPTION OF AN EMBODIMENT

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware Environment

Figure 1:
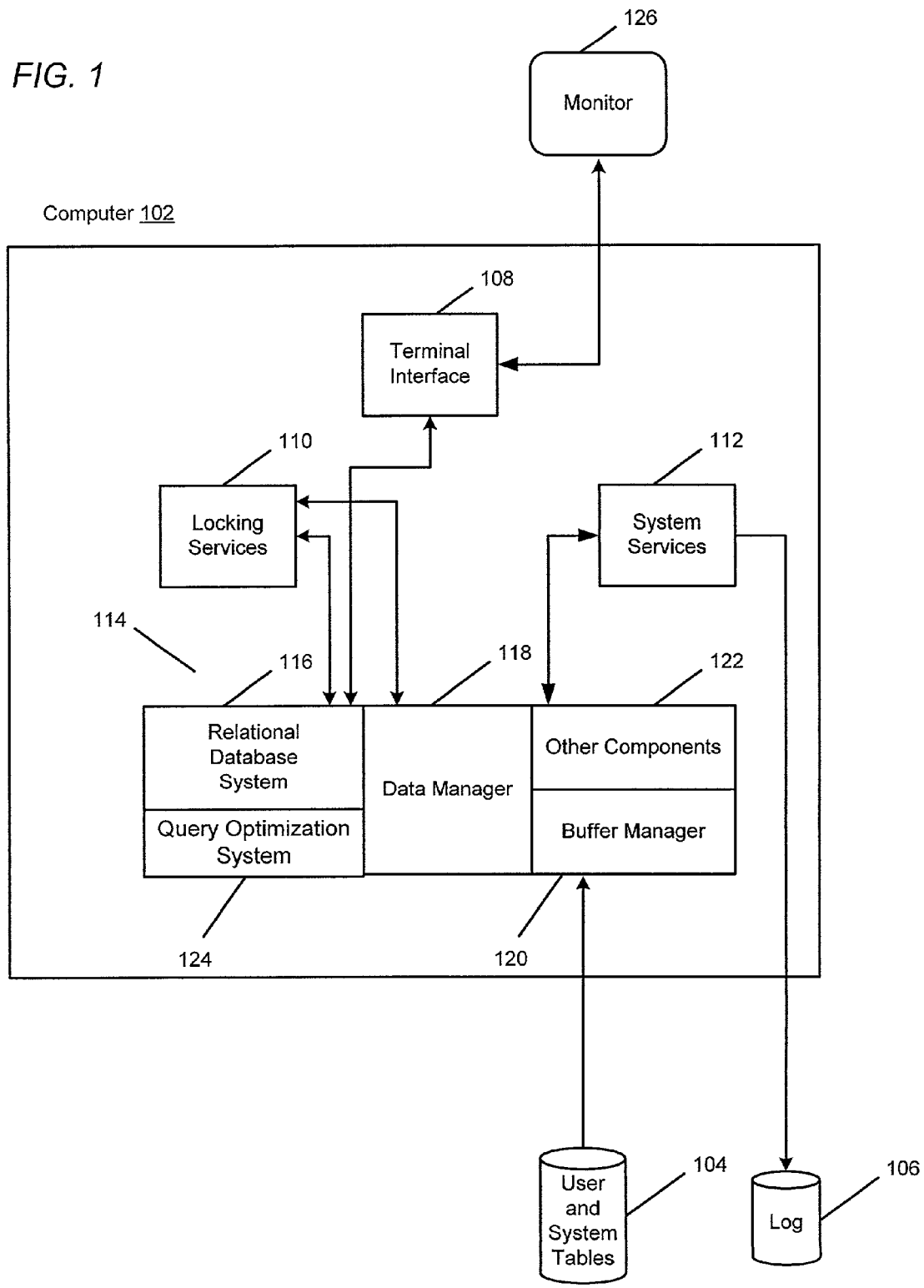
FIG. 1 is a block diagram illustrating components of a hardware environment.

FIG. 1 illustrates an exemplary computer hardware environment that could be used with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108 to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In some embodiments of the present invention, the DBMS software comprises the DB2® product offered by International Business Machines, Corporation for an operating system such as OS/2®, Windows NT®, various flavors of Unix® (e.g., AIX®, SUN®, HP8) or LINUX®. Those skilled in the art will recognize, however, that the present invention has application to any DBMS software whether or not the DBMS software uses SQL.

As illustrated in FIG. 1, a DB2® architecture includes three major components: the Internal Resource Lock Manager (IRLM) 110, the Systems Services module 112, and the Database Services module 114. The IRLM 110 handles locking services, because DB2® treats data as a shared resource, thereby allowing any number of users to access the same data simultaneously, and thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e. definition, access control, interpretation, compilation, database retrieval, and update of user and system data. Additionally, a Query Optimization System 124 works with these submodules to optimize queries.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator via operator interface 108. The Database Services module 114 then derives or synthesizes instructions from the SQL statements for execution by the computer system 102. Generally, the RDBMS software, the SQL statements, and the instructions derived therefrom, are all tangibly embodied in and/or readable from a computer-readable medium, e.g. one or more of the data storage devices 104 and 106.

Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Query Optimization System

The Query Optimization System 124 provides a novel technique for exploiting statistics on automatic summary tables to obtain improved cardinality estimates for queries. The improved cardinality estimates are applied when selecting a query execution plan from among multiple available ones. That is, improved cardinality estimation assists with selection of a query execution plan that is more efficient than other possible query execution plans.

1.0 Introduction

The query optimizer in a database management system (DBMS) is responsible for translating an SQL query into an efficient query execution plan (QEP). The QEP dictates the methods and sequence used for accessing tables, the methods used to join these tables, where predicates are applied, and so on. The QEP is interpreted by the DBMS when the query is subsequently executed.

There may be a large number of feasible QEPs, even for a simple query. The optimizer determines the best of these alternatives by modeling the execution characteristics of each one and choosing the QEP that minimizes some optimization goal, such as response time or use of system resources. P. Griffiths Selinger, M. M. Astrahan, D. D. Chamberlin, R. A. Lorie, and T. G. Price, "Access Path Selection in a Relational Database Management System", *Procs.* 1979 *ACM SIGMOD Conf.* (May 1979), pp. 23-34.

1.1 Cardinality Estimation

One of the most important factors in determining the execution characteristics of a QEP operation, and hence a QEP, is the number of records on which it operates. Certain QEP operations reduce the number of records seen by subsequent operations by applying predicates. It follows that one of the most important tasks of a cost-based optimizer is the estimation of the number of rows, or cardinality, of intermediate results after predicates are applied.

The following query is a definition of an auto-sales table for recording automobile sales transactions. In particular, the CREATE TABLE statement creates a table named auto-sales with columns for "id" (i.e., identification), "make", "model", "type", "color", "msrp", "markup", "selling-price", and "date".

auto-sales table
CREATE TABLE auto-sales
(id, make, model, type, color, msrp, markup, selling-price, date);

The following is a query that seeks the actual selling price of green-shaded, Honda Accord hatchbacks, with an asking price of over $21,000. In particular, the SELECT statement selects a selling-price from the auto-sales table from each row in which the car is a honda accord hatchback, with a "greenish" color, and the price of the car (i.e., the msrp+markup) is over $21,000.

Query 1
SELECT selling-price
FROM auto-sales
WHERE make='honda' and model='accord' and type='hatchback'
color like '% green %' and msrp+markup>$21,0000

The following are two alternative QEPs for this query, using the common data flow representation of a QEP. Guy M. Lohman, "Grammar-like Functional Rules for Representing Query Optimization Alternatives", *Procs. of* 1988 *ACM SIGMOD Conf.* (May 1988), pp. 18-27.

QEP 1
FETCH (auto-sales, type='hatchback', msrp+markup>21,000, color like % green %)
|
IXSCAN (IMM, make='honda', model='accord')
QEP 2
FETCH (auto-sales, make='honda', msrp+markup>21,000, color like % green %)
|
IXSCAN (ITM, type='hatchback', model='accord')

These QEPs represent typical index accesses to the "auto-sales" table. QEP 1 uses index "IMM" on the columns "make" and "model" to directly access the records with Honda Accord sales information. This is represented by the IXSCAN operator with the index name and the predicates "make='honda'" and "model='accord'" as arguments. Remaining columns of qualifying records are then retrieved from the table via the FETCH operation. This operation filters records further by applying the predicates "type='hatchback'", "msrp+markup>21,000", and "color like '% green %'". QEP 2 uses index "ITM" on the columns "type" and "model" and the predicates "type='hatchback'", and "model='accord'" to filter records before accessing the table and applying the remaining predicates. The most important factor in deciding the relative efficiency of the two QEPs is the estimation of the number of rows that must be fetched from the table, i.e., the cardinality of the intermediate result produced by the respective IXSCAN operations.

Many optimizers base cardinality estimates on the same probabilistic model that was used in the system R prototype. P. Griffiths Selinger, M. M. Astrahan, D. D. Chamberlin, R. A. Lone, and T. G. Price, "Access Path Selection in a Relational Database Management System", Procs. 1979 ACM SIGMOD Conf. (May 1979), pp. 23-34. Each conjunct, or predicate, of a search condition (e.g., a WHERE or HAVING clause) is assigned a so-called selectivity, which effectively represents the probability that the predicate is true for a given row. A given selectivity estimate is typically derived from statistics about the database, such as the number of distinct values of a referenced column. More detailed statistics such as frequent values (Akira Shibamiya et al., "Data Base Optimizer Using Most Frequency Values Statistics", U.S. Pat. No. 4,956,774, issued Sep. 11, 1990) or histograms (Viswanath Poosala and Yannis E. Ioannidis, "Selectivity Estimation Without the Attribute Value Independence Assumption", *Proc. of the* 23*rd Conference on Very Large Data Bases*, Athens, Greece (1997), pp. 486-495) are used to model non-uniform column distributions.

Since statistics on the combined domains of multiple columns are not typically collected, the selectivity of one predicate is generally assumed to be independent of the selectivity of another. Under this simplifying assumption, it is natural for cardinality estimation to proceed incrementally. That is, by progressively multiplying the cardinality of the base table by the selectivity of each predicate as it is applied. As shown in the previous example, predicates can be applied in different orders in different QEPs. Predicates are generally applied as soon as they become eligible, or when all of the columns they reference are available. A predicate is eligible to be applied on the automatic summary table if it can be evaluated using the output columns and expressions of the automatic summary table. Regardless of the order of predicate application, QEPs that produce the same intermediate result (in terms of tables accessed and predicates applied) should have the same cardinality estimate.

The following discussion in this section considers how cardinality estimation would proceed for QEP1 and QEP2 under this basic probabilistic model. The following table lists statistics and selectivity estimates for relevant tables, columns, and predicates of Query 1:

Table and Column Cardinalities
auto-sales=1,020,510 rows
make=720 distinct values
model=3650 distinct values
type=1590 distinct values
Selectivity Estimates Assuming Uniform Distributions:
make='honda'=1/720=0.00139
model='accord'=1/3650=0.000274
type='hatchback'=1/1590=0.000629
msrp+markup>$21,000=1/3=0.333 (i.e., a guess for lack of statistics on expressions)
color like '% green %'=0.050 (i.e., a guess for lack of appropriate statistics for the complex comparisons)

Assuming that column values are uniformly distributed, which is typically done for lack of more detailed statistics, the selectivity estimates of the predicates "make='honda'" and "model='accord'" are 1/720=0.00139 and 1/3,65.000274 respectively. Moreover, since the traditional optimizer assumes that the selectivity of one predicate is independent of the selectivity of another, the cardinality estimate for the IXSCAN of QEP 1 is computed by multiplying the cardinality of the "auto-sales" table by these selectivity estimates: 1,020,510*0.00139*0.000274=0.39. The FETCH operator further refines the cardinality estimate of the IXSCAN, which is stored as a property of the IXSCAN operator, by multiplying the selectivity of the predicates it applies: 0.39*0.000629*0.333*0.05=0.0000041. Using the same logic, the cardinality estimate for the IXSCAN for QEP 2 is: 1,020,510*0.000629*0.000274=1.75 and the cardinality of the subsequent FETCH operator is: 1.75*0.00139*0.333*0.05=0.0000041.

This example illustrates some fundamental problems with this basic cardinality estimation model. First of all, the assumption that the selectivity of one predicate is independent of another is violated. Only Honda makes the model Accord so the probability that the predicate "make='Accord'" is true for a given row is much higher if "model='Accord'" is true (and vice-versa). Consequently, the optimizer may erroneously favor QEP 1 because it believes that very few rows will need to be retrieved from the table. One approach used for determining when the independence assumption is invalid is to treat the dependent columns "make" and "model" as a single domain when assigning selectivity estimates. See Mohamed Ziaudin "Methods for Collecting Query Workload Statistics on Column Groups Identified by RDBMS Optimizer", U.S. Pat. No. 5,899,986, issued May 4, 1999. This presumes that there are statistics that model the combined distribution of these columns, such as distinct value statistics on a composite index such as MM.

Another problem illustrated by this example is that an optimizer is typically relegated to guessing as to the selectivity of complex predicates such as "color like % green %" and "msrp+markup>21,000". This is because the column distribution statistics available to most query optimizers are only useful for estimating the selectivity of simple predicates, i.e., those that compare a column to a constant literal (e.g., 'accord', 'hatchback', 'honda') using a simple relational operation (e.g., =, >). Most optimizers are ill equipped to deal with predicates that use complex comparison operators such as "like", or predicates that compare expression results.

Any of these problems can be solved via more sophisticated statistics; however, there is significant overhead associated with collecting and storing statistics. Therefore, it behooves the optimizer to seek out and use all available statistics in as creative a manner as possible. Section 1.3 shows how statistics on automatic summary tables can be exploited to solve these, and other, cardinality estimation problems. But first, in section 1.2, automatic summary tables and their typical use in query optimization are described.

1.2 Automatic Summary Tables

An automatic summary table, or ast for short, is a precomputed query that is used to speed up the execution of other queries. The following is a definition of an automatic summary table (ast) "green-auto-sales" table. This automatic summary table contains only sales information for green-shaded cars, as specified by the query in the table definition.

aSt Green-Auto-Sales
CREATE TABLE green-auto-sales AS
(Select * from Auto-Sales where Color Like '% Green %')

This ast can be used as a starting point to satisfy Query 1. Since the predicate "color like % green %" was applied when the ast was populated, only the predicates "make='honda'", "model='accord'", "type='hatchback'" and "msrp+markup>$21,000" need to be applied to the green-auto-sales ast to achieve the query result. Using an ast in lieu of the base table to answer the query might be significantly faster, depending upon how much smaller the ast is relative to the base table, what indexes are available, how it is partitioned, etc. Since there are many factors involved, the optimizer typically builds and costs all alternative QEPs. See cross-referenced Application No. 60/134,745, entitled "COST-BASED ROUTING OF AUTOMATIC SUMMARY TABLES", filed on May 18, 1999, by Ting Yu Leung et al.

Not every ast in the database can be used to satisfy a given query. The techniques used for making this decision require performing matching and compensation between the query and ast definition. There are extensive research activities and literature on this topic, such as L. S. Colby, R. L. Cole, E. Haslam, N. Jazaeri, G. Johnson, W. J. McKenna, L. Schumacher, D. Wilhite. Red Brick Vista: Aggregate Computation and Management, *Proc. of the* 14*th Intl. Conference on Data Engineering*, Orlando, Fla., 1998; R. Bello, K. Dias, A. Downing, J. Feenan, J. Finnerty, W. Norcott, H. Sun, A. Witkowski, M. Ziauddin, Materialized Views In Oracle, *Proc. of the* 24*th VLDB Conference*, New York, 1998; and D. Srivastava, S. Dar, H. Jagadish, A. Levy, Answering Queries with Aggregation Using Views, *Proceedings of the* 22*nd VLDB Conference*, Mumbai, India, 1996, and are not part of this invention.

An ast that can be used to satisfy a query overlaps with the query. In general terms, this means two things:

1. The set of predicates applied by the ast is a subset of the predicates required by the query. i.e., the query result can be achieved by applying the remaining predicates from the query against the ast.
2. Either the ast has a superset of the columns required by the query, or the missing columns are functionally determined by one or more of the columns in the ast output.

An ast that satisfies only 1) vertically overlaps the query. Trivially, an ast that overlaps the query also vertically overlaps the query. To illustrate these points, again consider the ast "green-auto-sales", as well as the asts "green-auto-sales2", "green-auto-sales3", and "green-auto-sales4" below:

ast Green-Auto-Sales2
CREATE TABLE green-auto-sales2 (id) AS
(SELECT id FROM auto-sales WHERE color like '% green %')
ast Green-Auto-Sales3
CREATE TABLE green-auto-sales3 (make, model, color) AS
(SELECT make, model, color FROM auto-sales WHERE color like '% green %')
ast Green-Auto-Sales4
CREATE TABLE green-auto-sales4 AS
(SELECT * FROM auto-sales WHERE color like '% green %' and make='Ford')

As discussed above, "green-auto-sales" overlaps Query 1 because the predicates (i.e., color like '% green %') applied by the ast are a subset of those required by the query (i.e., make='honda' and model='accord' and type='hatchback' and color like '% green %' and msrp+markup>$21,0000), and, all columns required by the query are available in the ast output (i.e., all columns are selected).

The ast "green-auto-sales2" also overlaps Query 1 even though it is missing columns required by the query (e.g., "type"). Assume that the "id" column is a primary key for the "auto-sales" table. This column can be used to retrieve the missing columns because it functionally determines all other columns of the table. The optimizer can simply rejoin the ast with the "auto-sales" table, matching on the "id" column to retrieve the missing column values for a given row. See cross-referenced Application No. 60/135,133, entitled "OPTIMIZING QUERIES USING AUTOMATIC SUMMARY TABLES," filed on May 20, 1999, by Roberta Jo Cochrane et al.

The ast "green-auto-sales3" does not overlap the query because it is missing columns, and no output columns functionally determine the missing columns; however, it does vertically overlap the query, because the predicates it applies are a subset of the predicates required by the query.

Finally, the ast "green-auto-sales4" does not overlap the query, nor does it vertically overlap the query. This is because it applies a predicate, "make='Ford'", that is not one of the predicates required by query.

1.3 The Use of Statistics on Automatic Summary for Improved Cardinality Estimates An ast is just another database table; therefore, it can have statistics. This section describes two techniques used by the Query Optimization System 124 for exploiting these statistics to improve selectivity estimates for predicates of a query. Consequently, these techniques result in more accurate cardinality estimates for the query. They can be applied even when the ast supplying the statistics can not be used as a starting point to satisfy the query. More specifically, they apply to asts that are simple, and that vertically overlap the requirements of a query. An ast is simple if the query defining the ast is of the form: "<select-clause><from-clause><where-clause>" and the <select-clause> does not use the "DISTINCT" attribute or reference any aggregate functions (e.g., SUM, MAX, or RANK). That is, the query selects from one or more tables, applies a search condition, and involves no distinct or aggregation operations.

1.3.a First Technique

In the discussion in Section 1.1 of cardinality estimation for QEP 1 and QEP 2, the optimizer could only guess as to the selectivity of the predicate "color like % green %" for lack of appropriate statistics. Consider once again the ast "green-auto-sales", which is a table that is populated with the net effect of applying the predicate "color like % green %". The ast "green-auto-sales" has statistics that enable the selectivity of the predicate "color like % green %" to be accurately estimated using the ratio "Card(green-auto-sales)/Card (auto-sales)" where "Card(green-auto-sales)" represents the cardinality of the table "green-auto-sales", and "Card(auto-sales)" represents the cardinality of the "auto-sales" table. Moreover, the asts "green-auto-sales2" and "green-auto-sales3" can be exploited in the same way. The ast "green-auto-sales2" also overlaps Query 1. Note that the ast "green-auto-sales3" does not overlap query requirements, and hence, cannot be used to satisfy the query. However, the ast "green-auto-sales3" does vertically overlap the query, and hence, can be used to improve the selectivity estimate of the predicate.

Consider another example of this technique. Recall that the combined selectivity of the predicates "make='honda'" and "model='accord'" under the independence assumption was wildly underestimated. The Query Optimization System 124 improves its cardinality estimation using an ast. The following is a definition of an ast "accord-sales":

ast Accord-Sales
CREATE TABLE accord-sales (id, type, asking-price) AS (SELECT type FROM auto-sales WHERE make='honda' and model='accord')

The technique of the invention is applied to the ast "accord-sales" to obtain an accurate estimate of the combined selectivity of the predicates "make='honda'" and "model='accord'". That is, Card(accord-sales)/Card (auto-sales) is an accurate estimate of the combined selectivity of these predicates.

The technique of the invention is generalized as follows:
Let Q denote a query.
Let A denote a simple ast that vertically overlaps Q.
Let Preds(A) denote the predicates applied by ast "A".
Let Card(A) denote the cardinality of A.
Let CardTables (A) denote the product of the cardinalities of the base tables referenced in both the ast definition and Q, i.e., the intersection of the tables referenced in the query and the ast definition.

The ratio "Card(A)/CardTables (A)" provides an accurate selectivity estimate for, Preds(A), the set of predicates applied by the ast. Henceforth, this estimate is referred to as "R(A)" or cardinality ratio.

1.3.b Second Technique

The Query Optimization System 124 also provides a second technique for exploiting ast statistics for more accurate selectivity estimates. Consider the three predicates of Query 1: "make='Honda'", "model='Accord'" and "type='hatchback'". It is very likely that these three predicates are not independent as few Honda Accord hatchbacks were made over the years. The ast "accord-sales", above, can help with this problem as well. Note that it produces the "type" column. Assume that there are distribution statistics on this column. Let "Sel (type='hatchback', accord-sales)" denote the typical selectivity estimate of the predicate "type='hatchback'" using the statistics from the ast "accord-sales". The combined selectivity of the three predicates can be estimated by the product Sel (type='hatchback', accord-sales)*R(accord-sales).

This is a much better estimate than the estimate obtained under the independence assumption since "R(accord-sales)" (i.e., "Card(accord-sales)/CardTables (auto-sales)") factors in the dependence between the predicates "make='Honda'" and "model='Accord'". Furthermore, the estimate using the statistics from the ast "accord-sales" incorporates any dependence between the values of the "type" column and the predicates "make='Honda'", "model='Accord'", because it was computed from statistics that were collected after these predicates were applied.

The second technique is generalized as follows:
Let Q denote a query.
Let A denote a simple ast that vertically overlaps Q.
Let Preds(A) denote the predicates applied by ast "A".
Let EligiblePreds(A) denote all query predicates that can be computed using the output columns of A.
Let SubPreds(i) denote any non-empty subset of EligiblePreds(A)-Preds (A) (i.e., any subset not already applied by A (i.e., unapplied eligible predicates).
Let DepPreds(i)=SubPreds(i)+Preds(A) (i.e., the union of ast predicates and this subset).
Let Sel(SubPreds(i), A) denote the combined selectivity estimate ("subpredicate combined selectivity") of these predicates using the statistics of A assuming independence (i.e., the product of the selectivities of each predicate in SubPreds(i), where the selectivites were assigned using statistics of A).

Sel(SubPreds(i), A)*R(A) is a better combined selectivity estimate for DepPreds(i) than what would normally be estimated using the statistics of base tables under the typical assumption of predicate independence.

It is interesting to consider a special case of this second technique that occurs when Preds(A) is empty. Consider again the cardinality estimation example from section 1.1. Recall that the optimizer had to guess as to selectivity of the predicate "msrp+markup>21,000" for lack of statistics on expressions. Using the technique of the invention, statistics may be obtained from the following ast "car-prices":

ast Car-Prices
    CREATE TABLE car-prices (id, asking-price) AS
    (SELECT id, msrp+markup FROM auto-sales);

Note that the ast "car-prices" computes the expression "msrp+markup" as the output column "asking-price". The Query Optimization System 124 can use distribution statistics on this column to obtain a more reasonable estimate of the selectivity of the predicate "msrp+markup>21,000".

Applying the second technique yields the desired result. Note that Preds(car-prices) is empty; consequently, Card(car-prices) and card(auto-sales) are equal, and R(car-prices)=1. The formula Sel (msrp+markup>21,000, car-prices)*R(car-prices) reduces to "Sel(msrp+markup>21,000, car-prices)", i.e., the selectivity of "msrp+markup>21,000" as computed using the ast statistics rather than query statistics.

2.0 A Query Optimization Technique for Obtaining Improved Cardinality Estimates Using Statistics on Automatic Summary Tables In section 1.3, two techniques for exploiting ast statistics to get improved selectivity estimates for one or more predicates of a query were described. Those techniques are the basis of the invention. In this section, these ideas are formally presented in terms of one embodiment. The embodiment is an incremental cardinality estimation process that uses adjustment factors. See Application No. 60/134,789, entitled "QUERY OPTIMIZATION METHOD FOR INCREMENTALLY ESTIMATING THE CARDINALITY OF A DERIVED RELATION WHEN STATISTICALLY CORRELATED PREDICATES ARE APPLIED," filed on May 19, 1999, by Johann Christoph Freytag et al.

An adjustment factor is essentially a value that is used to improve the cardinality estimate of an intermediate result whenever one or more predicates associated with the adjustment factor are applied. In the prior art, adjustment factors were used to account for selectivity dependence between multiple predicates. However, they can be used to improve cardinality estimates when one or more predicates are applied. Section 2.1 gives an overview of this approach and shows that, in this embodiment, the invention can be formally described by way of a technique that computes adjustment factors from ast statistics. This technique is formally described in section 2.2. Section 2.3 provides an example of the technique at work.

2.1 Incremental Cardinality Estimation using Adjustment Factors

As described in section 1.1, predicates are typically applied by a query execution plan (QEP) independently, and cardinality estimation proceeds incrementally, by progressively multiplying the cardinality of base tables by the pre-computed selectivity of each predicate as it is applied. The main advantage to this approach is that it is efficient. The selectivity of each predicate is computed once rather than each time it is considered in an alternative QEP. The main disadvantage of this approach is that it assumes the selectivity of predicates are independent. Adjustment factors were conceived as a means of dealing with predicates that are not independent, while maintaining the efficiency of incremental cardinality estimation.

An adjustment factor is a value associated with a set of predicates, "P", that are not independent. This presumes that there are database statistics that support this conclusion, such as combined distribution statistics on columns referenced by predicates in "P", or as was shown in section 1.3, statistics on an ast that applies some subset of the predicates in "P". The adjustment factor is computed using the ratio "DS/IS", where "DS" is a dependent selectivity that represents the combined selectivity estimate of "P" computed with the statistics used to infer non-independence and "IS" is an independent selectivity that denotes the combined selectivity of "P" computed assuming independence. Adjustment factors and their associated predicate sets are stored in an adjustment vector for use during QEP enumeration, i.e., for use during cardinality estimation.

With the adjustment vector populated, cardinality estimation proceeds incrementally as usual. Now, however, after a predicate selectivity is applied to the cardinality estimate, the adjustment factors of eligible adjustment vector entries are applied as well. An adjustment vector entry becomes eligible as soon as all of its predicates have been applied. Prior to applying an adjustment factor for a set of predicates "P", all previously applied adjustment factors associated with sets of predicates that are subsets of "P" are backed out.

As an example of this approach, recall the discussion of incremental cardinality estimation for QEP 1 from section 1.1. The individual selectivity estimates for the predicates "make='honda'", "model='accord'", and "type=hatchback'" were 1/720=0.00139, 1/3,650=0.000274, and 1/1590=0.000629 respectively. Assume that the ast "accord-sales", defined above, has 355,010 rows, and the auto-sales table has 1,020,510 rows. The optimizer can use the ast cardinality to estimate the combined selectivity of the non-independent predicates "make='honda'" and "model='accord'" as 355,010/1,020,510=0.3479, i.e., using the ratio R(accord-sales) defined in section 1.3. Assume further that the number of distinct values of the "type" column for the "accord-sales" ast is 3. The optimizer can use this statistic to estimate the combined selectivity of all three predicates as 1/3*0.3479=0.1159, i.e., using the formula Sel (type='hatchback', accord-sales)*R(accord-sales) defined in section 1.3. Using the ratio DS/IS, the adjustment factors associated with the sets of predicates "make='honda'", "model='accord'" and "type=hatchback'" are 0.3479/(0.00139*0.000274)=913,393.59 and 0.116/(0.00139*0.000274*0.000629)=484,219,170 respectively.

The adjustment factors are applied during cardinality estimation. The IXSCAN operator of QEP 1 applies the predicates "make='honda'" and "model='accord'". Cardinality estimation is done in the usual way assuming independence: 1,020,510*0.00139*0.000274=0.3886. The adjustment factor associated with those two predicates becomes eligible, and is applied to this cardinality estimate: 0.3886*913,393.59=355,010. Note that this is exactly the cardinality of the ast and, therefore, a much better estimate as to the number of rows that will be retrieved from the table. The FETCH proceeds as usual under the independence assumption, further refining the IXSCAN cardinality estimate with the selectivity estimates of the predicates it applies: 355,010*0.000629*0.333*0.05=37.18. The adjustment factor for the predicates "make='honda'", "model='accord'" and "type=hatchback'" then becomes eligible. Since the predicates of the previously applied adjustment factor are a subset of these predicates, the previous adjustment factor must be backed out prior to application of the new adjustment factor. Thus, the adjusted cardinality of the FETCH is computed by: (37.18/913,393.59)*484,219,170=19,710.

2.2 Deriving Adjustment Factors from Asts

In this section, a formal specification of an embodiment of the invention is provided. In one embodiment, the Query Optimization System 124 provides an incremental cardinality estimation process that supports adjustment factors. The invention can be specified as a technique for computing adjustment factors for subsets of query predicates, using the statistics of simple asts that vertically overlap query requirements. Recall that an ast is simple if the query defining the ast is of the form: "<select-clause><from-clause><where-clause>" and the <select-clause> does not use the "DISTINCT" attribute or reference aggregate functions and that an ast vertically overlaps a query if the set of predicates applied by the ast is a subset of the predicates required by the query. i.e., the query result can be achieved by applying the remaining predicates from the query against the ast.

The formulas "R(A)=Card(A)/CardTables(A)" and "Sel (SubPreds(i), A)*R(A)", described in section 1.3, will be used to compute the numerators of these adjustment factors. It follows that the QEP enumeration phase of the adjustment factor process will then effect the desired improvements on cardinality estimation. The following steps represent the technique:

1) Determine SimpleVerticalAsts (i.e., the set of asts that vertically overlap the query)
2) For each ast, A, in SimpleVerticalAsts, compute all relevant adjustment vector entries as follows:
   2.1) Let Tables(A) denote the base tables referenced by A
       Let Preds(A) denote the predicates applied by A, Let Cols(A) denote the columns and expressions output by A
   2.2) Compute CardTables(A), the product of the cardinalities of the tables in Tables(A)
   2.3) Compute Sel(Preds(A)), the combined selectivity of Preds(A), using the usual means, e.g., using the statistics for the tables in Tables(A) and the independence assumption.
       Set Sel(Preds(A)) to 1 if Preds(A) is empty.
   2.4) Compute R(A)=Card(A)/CardTables(A)), i.e., the ratio R(A) described in section 1.3
   2.5) Compute AdjFactor(A)=R(A)/Sel(Preds(A)) i.e., the adjustment factor that will be used to factor in R(A) during cardinality estimation.
   2.6) If AdjFactor(A) is not equal to 1, add (Preds(A), Ad)Factor(A)) to the adjustment vector
   2.7) Compute EligiblePreds(A), the set of all query predicates that are eligible to be applied to A, i.e., the query predicates that reference only output columns and expressions of Cols(A)
   2.8) Compute EligiblePendingPreds(A)=EligiblePreds(A)−Preds(A), i.e., the set of query predicates eligible to be applied to A, but not yet applied by A
   2.9) For each of the non-empty subsets, SubPreds(i) of EligiblePendingPreds(A), i=1, . . . n
       2.9.1) Compute Sel(SubPreds(i), A), the combined selectivity of SubPreds(i), using the statistics of A
       2.9.2) SP=Sel(SubPreds(i), A)*R(A), i.e., the combined selectivity of the subset of predicates and ast predicates using ast statistics as described in section 1.3
       2.9.3) Compute DepPreds(i)=SubPreds(i) UNION Preds(A), i.e., the set of predicates whose combined selectivity will be adjusted based upon the combined selectivity of SubPreds(i) computed using ast statistics
       2.9.4) Compute Sel(DepPreds(i)), the combined selectivity of DepPreds(i), using the usual means, i.e., using the statistics for the tables in Tables(A) and the independence assumption.
       2.9.5) Compute AdjFactor(i)=SP/Sel(DepPreds(i), i.e., the adjustment factor that will be used to more accurately estimate the combined selectivity of DepPreds (i) during the planning phase.
       2.9.6) If AdjFactor(i) is not equal to 1, add (DepPreds(i), AdjFactor(i)) to the adjustment vector Step 1 computes the set of simple asts, A, whose definitions vertically overlap query requirements, as described in section 1.2. Steps 2.1 through 2.5 compute the adjustment factor for the predicates applied by a given ast using the formula R(A) as described in section 1.3. Step 2.6 adds the corresponding entry to the adjustment vector, provided the adjustment factor is not 1, which is the case if either the ast applies no predicates, or when those predicates are truly independent. Steps 2.7 through 2.9 compute all possible adjustment vector entries that can be derived using the formula Sel(SubPreds (i),A)*R(A) as described in section 1.3. Step 2.9.6 adds each entry to the adjustment vector, provided the adjustment factor is not 1, which is the case when the selectivity estimate using ast statistics yields the same result as when base table statistics are used.

2.3 An Example of the Technique at Work

In section 1.1 cardinality estimation for QEP1 and QEP2 was described. Moreover, in section 2.1, it was shown how the cardinality estimation of QEP 1 could be improved by way of adjustment factors computed from the statistics on the "accord-sales" ast. In this section, a more formal example is shown of the computation of adjustment factors for the predicates applied by Query 1, given the familiar "accord-sales", "green-auto-sales", and "car-prices" asts defined previously. The following are ast definitions, along with relevant statistics. The base table statistics previously defined will also be used. Note, that rounding is used; however, the main goal of the example is to illustrate the idea of the technique.

ast Green-Auto-Sales5
CREATE TABLE green-auto-sales5 (id, model, color) AS (SELECT id, model, color FROM auto-sales WHERE color like '% green %')
Table and Column Statistics for Green-Auto-Sales:
green-auto-sales=33,505 rows
ast Car-Prices
CREATE TABLE car-prices (id, asking-price) AS (SELECT id, msrp+markup FROM auto-sales);
Table and Column Statistics: for Car-Prices
car-prices=1,020,510 rows
msrp+markup=low value $11,350
msrp+markup=high value $127,000
ast Accord-Sales
CREATE TABLE accord-sales (id, type, asking-price) AS (SELECT id, type, msrp+markup FROM auto-sales WHERE make='honda' and model='accord')
Table and Column Statistics for Accord-Sales:
accord-sales=355,010 rows
type=3 distinct values
msrp+markup=low value $15,575
msrp+markup=high value $25,950

Note that all asts are simple, however, none of the asts overlap query requirements, because each is missing one or more columns required by the query. Nevertheless, all asts vertically overlap query requirements, as they apply a subset of the predicates required by the query. Thus, SimpleVerticalAsts={green-auto-sales5, car-prices, accord-sales}

The following discussion walks through the steps of the technique, computing the adjustment vector entries for ast "car-prices".

1.1) Tables (car-prices)={auto-sales}
   Preds(car-prices)={ }
   Cols(car-prices)={id, asking-price=msrp+markup}
1.2) CardTables(ast)=1,020,510
1.3) Sel(Preds(car-prices)=1
1.4) R(car-prices)=1,020,510/1,020,510=1
1.5) AdjFactor (car-prices)=1/1)=1
1.6) AdjustFactor (car-prices) is 1, so nothing to do. This is what happens when the ast applies no predicates.
1.7) EligiblePreds(car-prices)={msrp+markup>$21,000}. This is the only predicate that would be eligible for application based upon Cols(car-prices)={id, msrp+markup}
1.8) EligiblePendingPreds(car-prices)={msrp+markup>$21,000}−{ }={msrp+markup>$21,000}.
1.9) There is only one non-empty subset of EligiblePendingPreds(car-prices).
   1.9.1) Sel(SubPreds(1))=(21,000−11,350)/(127−000−4,350)=0.083, i.e., using interpolation with the high value and low value statistics for the asking-price column of car-prices
   1.9.2) SP=Sel(SubPreds(1)*R(car-prices)=0.083*1=0.83
   1.9.3) DepPreds(1)=(msrp+markup>$21,000 UNION { })={msrp+markup>$21,000}
   1.9.4) Sel(DepPreds(1))=0.33, i.e., the usual guess given no statistics on expressions.
   1.9.5) AdjFactor(1)=(1,020,510*0.083)/(0.33*1.020,510)=0.2515
   1.9.6) ({msrp+markup>$21,000}, 0.2515) is added to the adjustment vector.

Note that when the predicate msrp+markup>$21,000 becomes eligible during query planning, its usual inaccurate contribution to the cardinality estimate, 0.33, is multiplied by the adjustment factor 0.25. Thus, the more accurate selectivity estimate 033*0.2515=0.083, derived from statistics collected on the expression results, is factored in instead.

The following discussion walks through the steps of the technique, computing the adjustment vector entries for ast "green-auto-sales5".

2.1) Tables (green-auto-sales5)—{auto-sales}
   Preds(green-auto-sales5)={color like '% green %'}
   Cols(green-auto-sales5)={id, color}
2.2) CardTables(green-auto-sales5)=1,020,510
2.3) Sel(Preds(green-auto-sales5))=0.05, i.e., a guess, since there are no statistics for accurately determining the number of rows with the sub-string 'green'
2.4) R(green-auto-sales5)=335,010/1,020,510=0.348
2.5) AdjFactor (green-auto-sales5)=0.03828/0.05=0.6567
2.6) ({color like '% green %'}, 0.6566) is added to the adjustment vector.
2.7) EligiblePreds(green-auto-sales5)={color like '% green %'} This is the only predicate that would be eligible for application based upon Cols(green-auto-sales2)={id, color}
2.8) EligiblePendingPreds(green-auto-sales5)={color like '% green %'}-{color like '% green %'}={ }
2.9) There are no non-empty subset of EligiblePendingPreds(green-auto-sales5) and nothing more to do.

Note that the adjustment vector entry added in step 2.6 effectively allows one to get an exact selectivity estimate for the predicate "color like '% green %'".

Next, the following discussion walks through the steps of the technique, computing the adjustment vector entries for ast "accord-sales".

3.1) Tables (accord-sales)={auto-sales},
   Preds(accord-sales)={make='honda', model='accord'}
   Cols(accord-sales)={id, make, asking-price=msrp+markup}
3.2) CardTables(accord-sales)=1,020,510
3.3) Sel(Preds(accord-sales))=0.00139*0.000274=0.000003809, i.e., using the product of the individual selectivities, as per the independence assumption
3.4) R(A)=355,010/1,020,510=0.348
3.5) AdjFactor (accord-sales)=0.348/0.000003809=913,393.59
3.6) ({make='honda', model='accord'}, 913,393.59) is added to the adjustment vector as described in section 2.1
3.7) EligiblePreds(accord-sales)={type='hatchback', msrp+markup>$21,0000}
3.8) EligiblePendingPreds(green-auto-sales5)={type='hatchback', msrp+markup>$21,0000}-{make='honda', model='accord'}={type='hatchback', msrp+markup>$21,0000}
3.9) There are 3 non-empty subsets of EligiblePendingPreds(accord-sales):
   (1) SubPreds(1)={type='hatchback'}
   (2) SubPreds(2)={msrp+markup>$21,0000}
   (3) SubPreds(3)={type='hatchback', msrp+markup>$21,0000}
   3.9.1) Sel(SubPreds(1))=1/3=0.33, i.e., assuming uniform distribution, i.e., there are 3 distinct values for the column "type"
      Sel(SubPreds(2))=(21,000-15,575)/(25,950-15,575)=0.5229 i.e., using interpolation with the high value and low value statistics for the "asking-price" column of Sel(SubPreds(3))=0.33*0.5229=0.1748, i.e., using the product of the individual selectivities as per the independence assumption
   3.9.2) SP(1)=Sel(SubPreds(1))*R(accord-sales)=0.33*0.348=0.1148
      SP(2)=Sel(SubPreds(2))*R(accord-sales)=0.5229*0.348=0.1819
      SP(3)=Sel(SubPreds(3))*R(accord-sales)=0.1748*0.348=0.0608
   3.9.3) DepPreds(1)={type='hatchback', make='honda', model='accord'}
      DepPreds(2)={msrp+markup>$21,0000, make='honda', model='accord'}
      DepPreds(3)={type='hatchback', msrp+markup>$21,0000, make='honda', model='accord'}
   3.9.4) Sel(DepPreds(1))=0.000629*0.00139.0002739=2.3947e-10
      Sel(DepPreds(2))=0.33*0.00139*0.0002739=1.256e-7
      Sel(DepPreds(3))=0.000629*0.33*0.00139*0.0002739=7.903e-11
   3.9.5) AdjFactor(1)=0.1148/2.3947e-10=4.7939e08
      AdjFactor(2)=0.1818/1.256e-7=1.447,811e06
      AdjFactor(3)=0.0608/7.903e-11=7.6936453e08
   4.9.6) ({type='hatchback', make='honda', model='accord'}, 4.7939e08)
      ({msrp+markup>$21,0000, make='honda', model='accord'}, 1.447,811e06)
      ({type='hatchback', msrp+markup>$21,0000, make=, model='accord'},7.6936453e08) are added to the adjustment vector.

As described in section 2.1, the adjustments added in step 3.6, will effectively give the exact combined selectivity of the predicates "make='honda'" and "model='accord'". The three adjustments added in step 3.9.6, computed using the formula Sel(Subpreds(i),A)*R(A), give more accurate combined selectivity estimates for all subsets of query predicates whose columns are in the ast output, i.e., those whose selectivities can be computed using ast statistics. Since the ast statistics are dependent upon the predicates applied by the ast, the cardinality adjustment entries must include these predicates as well.

3.0 Flow Diagrams

Figure 2:
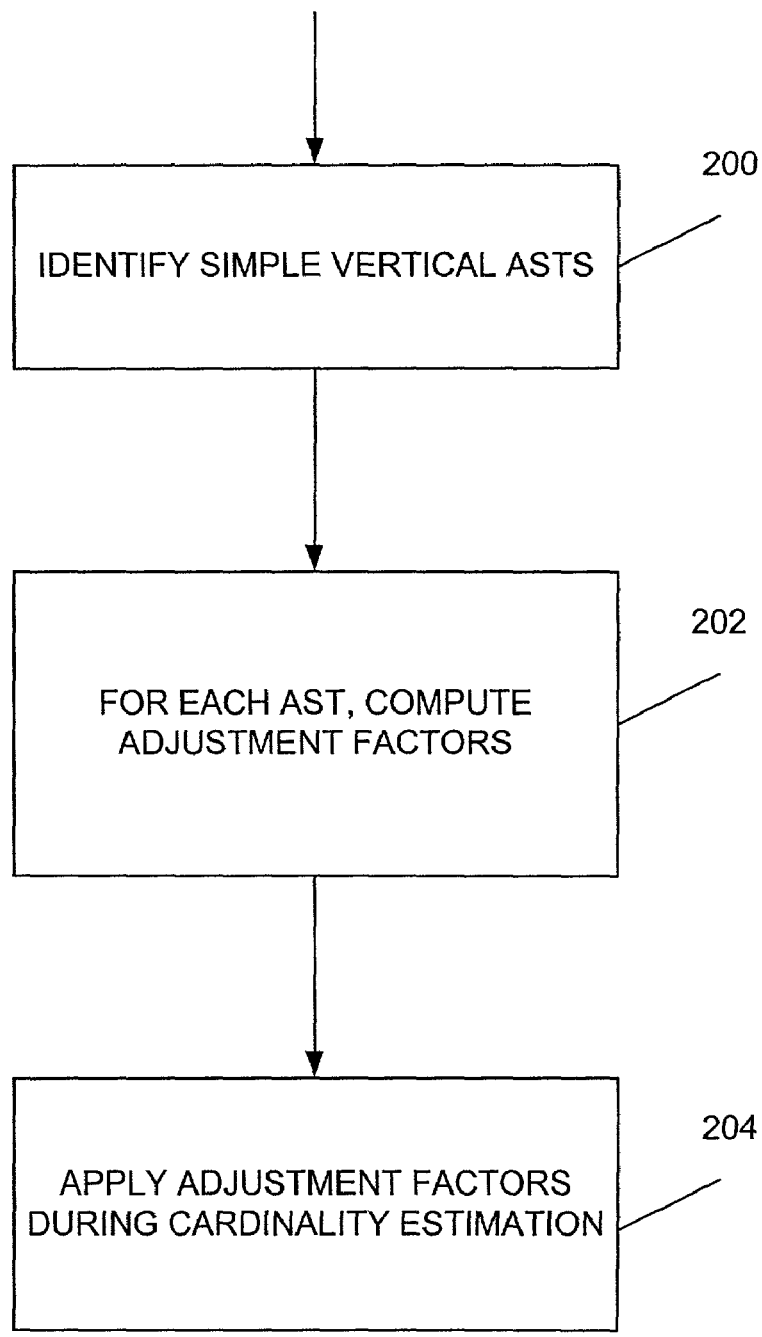
FIG. 2 is a flow diagram illustrating the process performed by the Query Optimization System to improve cardinality estimation.

FIG. 2 is a flow diagram illustrating the process performed by the Query Optimization System 124 to improve cardinality estimation. In block 200, the Query Optimization System 124 identifies simple, vertical automatic summary tables (asts). An ast is simple if the query defining the ast is of the form: "<select-clause><from-clause><where-clause>" and the <select-clause>does not use the "DISTINCT" attribute or reference aggregate functions. An ast vertically overlaps a query if the set of predicates applied by the ast is a subset of the predicates required by the query. i.e., the query result can be achieved by applying the remaining predicates from the query against the ast. In block 202, the Query Optimization System 124 computes adjustment factors for each ast. This will be described in more detail in FIGS. 3, 4A, and 4B. Once the adjustment factors have been computed, in block 204, the Query Optimization System 124 applies the adjustment factors during cardinality estimation. Note, that when a series of adjustment factors from an adjustment vector are applied, the Query Optimization System 124 backs out previously applied adjustment factors.

Figure 3:
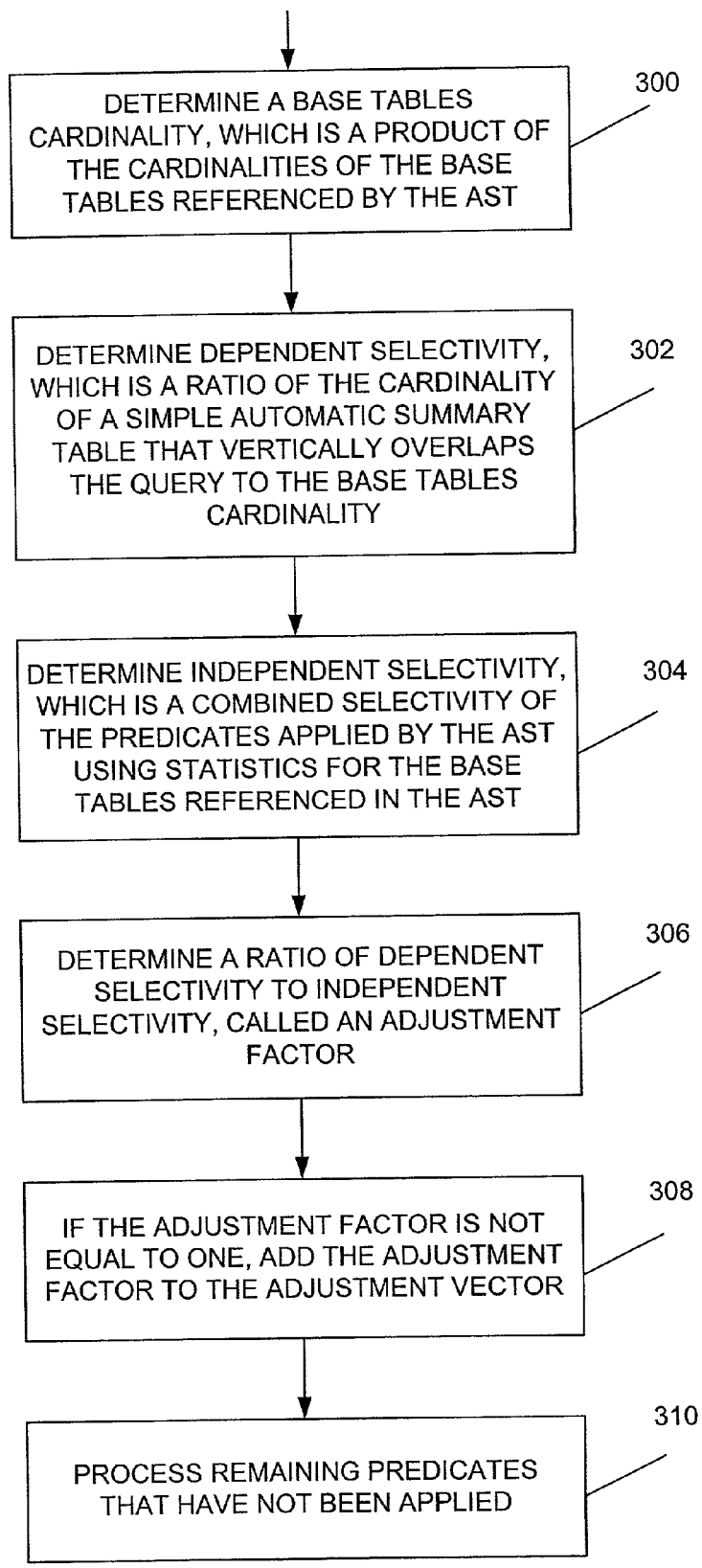
FIG. 3 is a flow diagram illustrating one technique performed by the Query Optimization System to generate adjustment factors.
Figure 4A:
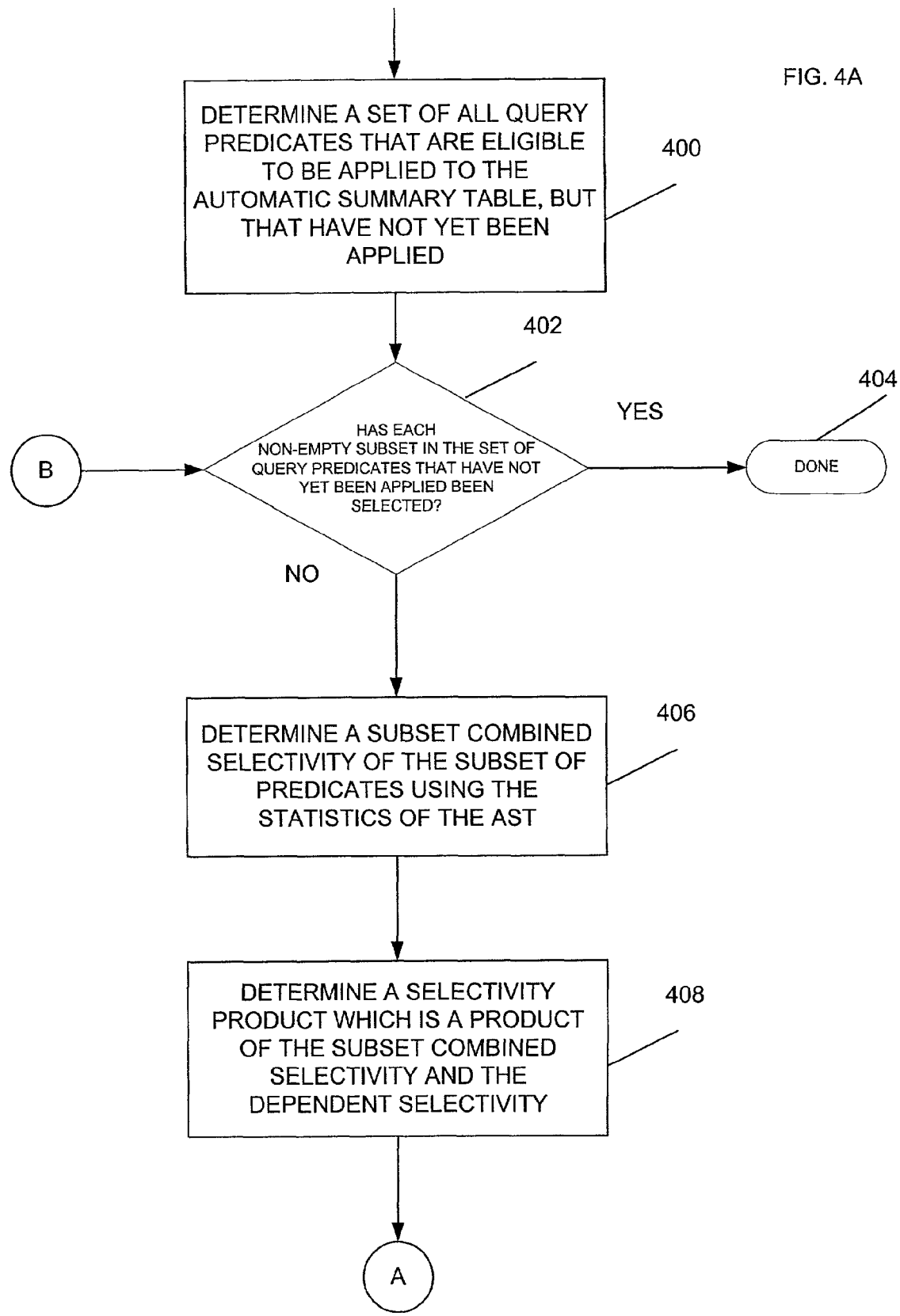
FIGS. 4A-4B are flow diagrams illustrating another technique performed by the Query Optimization System to generate adjustment factors.
Figure 4B:
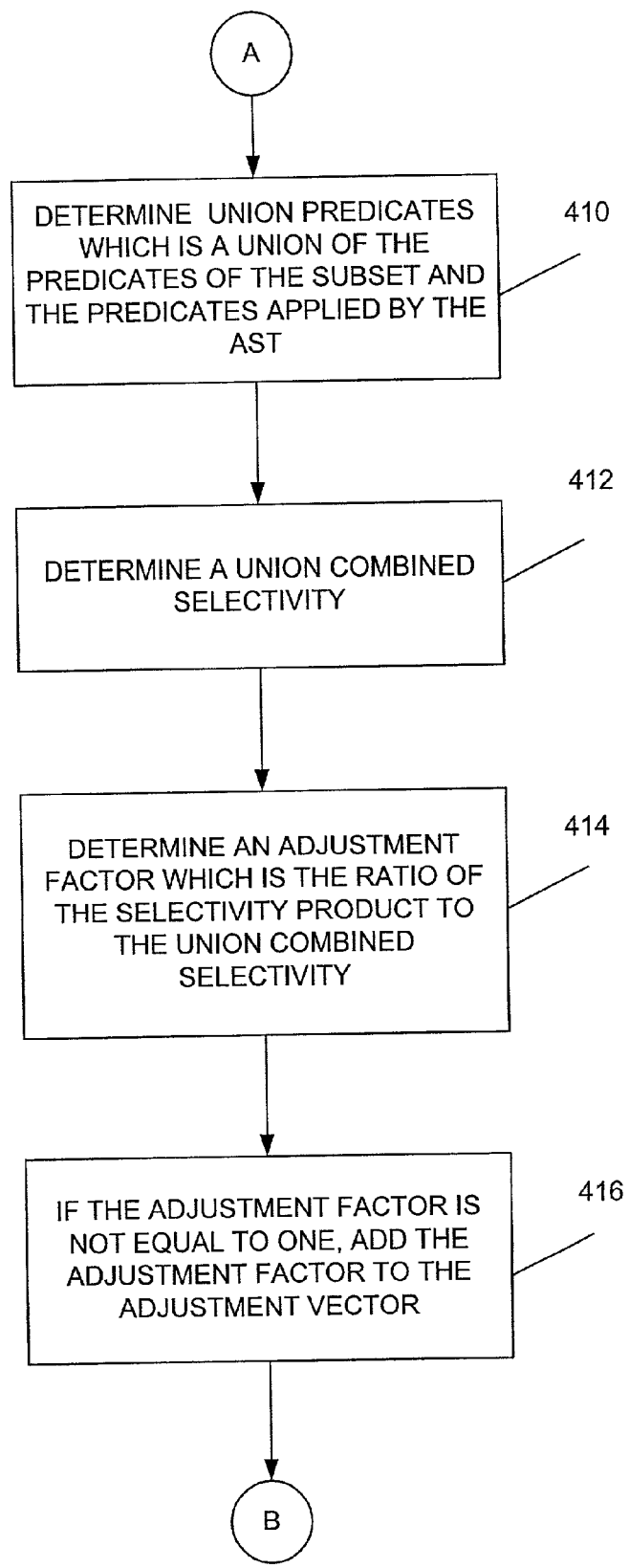

FIGS. 3, 4A, and 4B will refer to identifiers used in Section 2. FIG. 3 is a flow diagram illustrating one technique performed by the Query Optimization System 124 to generate adjustment factors. In block 300, the Query Optimization System 124 determines a base tables cardinality, which is a product of the cardinalities of the base tables referenced by the ast (i.e., CardTables(A)). In block 302, the Query Optimization System 124 determines dependent selectivity, which is a ratio of the cardinality of a simple automatic summary table that vertically overlaps the query to the base tables cardinality (i.e., R(A) or DS). In block 304, the Query Optimization System 124 determines independent selectivity, which is a combined selectivity of the predicates applied by the ast using statistics for the base tables referenced in the ast (i.e., Sel(Preds(A))). In block 306, the Query Optimization System 124 determines a ratio of dependent selectivity to independent selectivity, called an adjustment factor (i.e., R(A)/Sel(Preds(A))). If the adjustment factor is not equal to one, in block 308, the Query Optimization System 124 adds the adjustment factor to the adjustment vector. In block 310, the Query Optimization System 124 processes remaining predicates that have not been applied, which will be discussed in FIGS. 4A-4B.

FIGS. 4A-4B are flow diagrams illustrating another technique performed by the Query Optimization System 124 to generate adjustment factors. In block 400, the Query Optimization System 124 determines a set of all query predicates that are eligible to be applied to the automatic summary table, but that have not yet been applied (i.e., EligiblePendingPreds (A)). In block 402, the Query Optimization System 124 determines whether all subsets in the set of query predicates have been selected. If so, the Query Optimization System 124 continues to block 404, otherwise, the Query Optimization System 124 continues to block 406. In block 404, the Query Optimization System 124 is done.

In block 406, the Query Optimization System 124 determines a subset combined selectivity of the subset of predicates using the statistics of the ast (i.e., Sel(SubPreds(i),A)). In block 408, the Query Optimization System 124 determines a selectivity product which is a product of the combined selectivity and the dependent selectivity (i.e., SP=Sel(SubPreds(i),A)*R(A)). In block 410, the Query Optimization System 124 determines union predicates, which is a set of predicates that are a union of the predicates of the subset and the predicates applied by the ast (i.e., SubPreds(i) UNION (Preds(A)). In block 412, the Query Optimization System 124 determines a union combined selectivity (i.e., Sel(DepPreds (i))). In block 414, the Query Optimization System 124 determines an adjustment factor, which is the ratio of the selectivity product to the union combined selectivity (i.e., P/Sel (DepPreds(i))). If the adjustment factor is not equal to one, in block 415, the Query Optimization System 124 adds the adjustment factor to the adjustment vector.

CONCLUSION

This concludes the description of embodiments of the invention. The following describes some alternative embodiments for accomplishing the present invention. For example, any type of computer, such as a mainframe, minicomputer, or personal computer, or computer configuration, such as a time-sharing mainframe, local area network, or standalone personal computer, could be used with the present invention.

The foregoing description of embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

TRADEMARKS

IBM, DB2, OS/2 and AIX are trademarks or registered trademarks of International Business Machines, Corporation in the United States and/or other countries.

UNIX is a trademark registered of UNIX Systems Laboratories in the United States and/or other countries.

Windows NT is a trademark or registered trademark of Microsoft Corporation in the United States and/or other countries.

SUN is a trademark or registered trademark of Sun Microsystems in the United States and/or other countries.

HP is a trademark or registered trademark of Hewlett-Packard in the United States and/or other countries.

LINUX is a trademark or registered mark in the United States and/or other countries.

What is claimed is:

1. A method of optimizing execution of a query that accesses data stored on a data store connected to a computer, comprising:

generating cardinality estimates for one or more query execution plans for the query using statistics of one or more automatic summary tables that vertically overlap the query, wherein the statistics of the one or more automatic summary tables are used to improve a combined selectivity estimate of one or more predicates of the query, wherein the predicates are applied by one of the automatic summary tables, and wherein the selectivity estimate comprises a ratio of a cardinality of the automatic summary table to a product of cardinalities of base tables referenced in the automatic summary table and the query;

using the generated cardinality estimates to determine an optimal query execution plan for the query; and executing the optimal query execution plan for the query in order to access the data stored on the data store connected to a computer and then output the accessed data.

2. A method of optimizing execution of a query that accesses data stored on a data store connected to a computer, comprising:

generating cardinality estimates for one or more query execution plans for the query using statistics of one or more automatic summary tables that vertically overlap the query, wherein the statistics of the one or more automatic summary tables are used to improve a combined selectivity estimate of one or more predicates of the query, wherein zero or more predicates of the query are applied by one of the automatic summary tables, and wherein the remaining predicates are eligible to be applied on the automatic summary table;

using the generated cardinality estimates to determine an optimal query execution plan for the query; and executing the optimal query execution plan for the query in order to access the data stored on the data store connected to a computer and then output the accessed data.

3. The method of claim 2, wherein a predicate is eligible to be applied on the automatic summary table if it can be evaluated using the output columns and expressions of the automatic summary table.

4. The method of claim 3, further comprising determining a subpredicate combined selectivity estimate of the unapplied eligible predicates using column distribution statistics of the automatic summary table.

5. The method of claim 4, wherein a cardinality ratio comprises a ratio of a cardinality of the automatic summary table to a product of cardinalities of base tables referenced in the automatic summary table and the query.

6. The method of claim 5, wherein the selectivity estimate comprises a product of the subpredicate combined selectivity estimate and the cardinality ratio.

7. An apparatus for optimizing execution of a query, comprising:

a computer having a data store coupled thereto, wherein the data store stores data one or more computer programs, performed by the computer, for:

generating cardinality estimates for one or more query execution plans for the query using statistics of one or more automatic summary tables that vertically overlap the query, wherein the statistics of the one or more automatic summary tables are used to improve a combined selectivity estimate of one or more predicates of the query, wherein the predicates are applied by one of the automatic summary tables, and wherein the selectivity estimate comprises a ratio of a cardinality of the automatic summary table to a product of cardinalities of base tables referenced in the automatic summary table and the query;

using the generated cardinality estimates to determine an optimal query execution plan for the query; and executing the optimal query execution plan for the query in order to access the data stored on the data store connected to a computer and then output the accessed data.

8. An apparatus for optimizing execution of a query, comprising:

a computer having a data store coupled thereto, wherein the data store stores data one or more computer programs, performed by the computer, for:

generating cardinality estimates for one or more query execution plans for the query using statistics of one or more automatic summary tables that vertically overlap the query, wherein the statistics of the one or more automatic summary tables are used to improve a combined selectivity estimate of one or more predicates of the query, wherein zero or more predicates of the query are applied by one of the automatic summary tables and wherein the remaining predicates are eligible to be applied on the automatic summary table;

using the generated cardinality estimates to determine an optimal query execution plan for the query; and executing the optimal query execution plan for the query in order to access the data stored on the data store connected to a computer and then output the accessed data.

9. The apparatus of claim 8, a predicate is eligible to be applied on the automatic summary table if it can be evaluated using the output columns and expressions of the automatic summary table.

10. The apparatus of claim 9, further comprising determining a subpredicate combined selectivity estimate of the unapplied eligible predicates using column distribution statistics of the automatic summary table.

11. The apparatus of claim 10, wherein a cardinality ratio comprises a ratio of a cardinality of the automatic summary table to a product of cardinalities of base tables referenced in the automatic summary table and the query.

12. The apparatus of claim 11, wherein the selectivity estimate comprises a product of the subpredicate combined selectivity estimate and the cardinality ratio.

13. An article of manufacture comprising a non-transitory computer readable storage medium embodying one or more instructions executable by a computer to optimizing execution of a query that accesses data stored on a data store connected to the computer, comprising:

generating cardinality estimates for one or more query execution plans for the query using statistics of one or more automatic summary tables that vertically overlap the query, wherein the statistics of the one or more automatic summary tables are used to improve a combined selectivity estimate of one or more predicates of the query, wherein the predicates are applied by one of the automatic summary tables, and wherein the selectivity estimate comprises a ratio of a cardinality of the automatic summary table to a product of cardinalities of base tables referenced in the automatic summary table and the query;

using the generated cardinality estimates to determine an optimal query execution plan for the query; and executing the optimal query execution plan for the query in order to access the data stored on the data store connected to a computer and then output the accessed data.

14. An article of manufacture comprising a non-transitory computer readable storage medium embodying one or more instructions executable by a computer to optimizing execution of a query that accesses data stored on a data store connected to the computer, comprising:

generating cardinality estimates for one or more query execution plans for the query using statistics of one or more automatic summary tables that vertically overlap the query, wherein the statistics of the one or more automatic summary tables are used to improve a combined selectivity estimate of one or more predicates of the query, wherein zero or more predicates of the query are applied by one of the automatic summary tables, and wherein the remaining predicates are eligible to be applied on the automatic summary table;

using the generated cardinality estimates to determine an optimal query execution plan for the query; and executing the optimal query execution plan for the query in order to access the data stored on the data store connected to a computer and then output the accessed data.

15. The article of manufacture of claim 14, a predicate is eligible to be applied on the automatic summary table if it can be evaluated using the output columns and expressions of the automatic summary table.

16. The article of manufacture of claim 15, further comprising determining a subpredicate combined selectivity estimate of the unapplied eligible predicates using column distribution statistics of the automatic summary table.

17. The article of manufacture of claim 16, wherein a cardinality ratio comprises a ratio of a cardinality of the automatic summary table to a product of cardinalities of base tables referenced in the automatic summary table and the query.

18. The article of manufacture of claim 17, wherein the selectivity estimate comprises a product of the subpredicate combined selectivity estimate and the cardinality ratio.

* * * * *